(12) United States Patent
Chang et al.

(10) Patent No.: US 7,805,543 B2
(45) Date of Patent: Sep. 28, 2010

(54) HARDWARE ORIENTED HOST-SIDE NATIVE COMMAND QUEUING TAG MANAGEMENT

(75) Inventors: Naichih Chang, Shrewsbury, MA (US); Victor Lau, Marlboro, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 11/172,715

(22) Filed: Jun. 30, 2005

(65) Prior Publication Data

US 2007/0005896 A1    Jan. 4, 2007

(51) Int. Cl.
*G06F 3/00* (2006.01)
*G06F 13/00* (2006.01)
*G06F 5/00* (2006.01)
*G06F 13/12* (2006.01)
*G06F 13/38* (2006.01)

(52) U.S. Cl. .............................. 710/6; 710/34; 710/49; 710/74

(58) Field of Classification Search .................. 710/6, 710/30, 49, 74
See application file for complete search history.

(56) References Cited

U.S. PATENT DOCUMENTS

| | | | |
|---|---|---|---|
| 5,555,402 A * | 9/1996 | Tuma et al. ................ 703/24 |
| 5,781,926 A * | 7/1998 | Gaskins et al. ............ 711/145 |
| 5,802,340 A | 9/1998 | Mallick et al. |
| 5,862,406 A | 1/1999 | Matsumoto et al. |
| 6,145,016 A * | 11/2000 | Lai et al. .................. 710/4 |
| 6,681,274 B2 * | 1/2004 | Ennis ....................... 710/52 |
| 6,790,075 B1 | 9/2004 | Sung |
| 6,843,674 B1 | 1/2005 | Young |
| 6,917,992 B2 | 7/2005 | Grimsrud et al. |
| 7,028,106 B2 | 4/2006 | Foster et al. |
| 7,093,033 B2 | 8/2006 | Beckett et al. |
| 2003/0021239 A1 | 1/2003 | Mullendore et al. |
| 2003/0236952 A1 | 12/2003 | Grieff et al. |
| 2004/0019718 A1 | 1/2004 | Schauer et al. |
| 2004/0073719 A1 * | 4/2004 | Grimsrud et al. .......... 710/1 |

(Continued)

OTHER PUBLICATIONS

Dell Computer Corporation, Intel Corporation, Maxtor Corporation, Seagate Technology, Vitesse Semiconductor Corporation, Serial ATA II: Port Multiplier, Oct. 9, 2003, Revision 1.1.*

(Continued)

*Primary Examiner*—Alford W Kindred
*Assistant Examiner*—Farley J Abad
(74) *Attorney, Agent, or Firm*—Blakely, Sokoloff, Taylor & Zafman LLP

(57) ABSTRACT

Methods and apparatus for host-side Serial ATA Native Command Queuing (NCQ) tag management are disclosed. In one aspect, an exemplary apparatus may include a memory and an NCQ tag selection circuit in communication with the memory. The memory may store information for each of a plurality of different NCQ tag values. The information for each NCQ tag value may indicate whether or not a command having the NCQ tag value has been issued. The NCQ tag selection circuit may examine the information in the memory, and may select an NCQ tag value having information that indicates that a command having the NCQ tag value has not been issued. Systems and architectures including such apparatus are also disclosed.

16 Claims, 7 Drawing Sheets

U.S. PATENT DOCUMENTS

| | | | |
|---|---|---|---|
| 2004/0100944 | A1 | 5/2004 | Richmond et al. |
| 2004/0252716 | A1 | 12/2004 | Nemazie |
| 2004/0268169 | A1 | 12/2004 | Bashford et al. |
| 2005/0015532 | A1 | 1/2005 | Beckett et al. |
| 2005/0138191 | A1 | 6/2005 | Seto et al. |
| 2005/0138202 | A1 | 6/2005 | Seto |
| 2005/0149656 | A1 | 7/2005 | Seto |
| 2005/0166014 | A1* | 7/2005 | Kobayashi et al. .......... 711/112 |
| 2006/0004935 | A1 | 1/2006 | Seto et al. |
| 2006/0041691 | A1 | 2/2006 | Bashford et al. |
| 2006/0041699 | A1 | 2/2006 | Day |
| 2006/0064568 | A1 | 3/2006 | Seto et al. |
| 2006/0294286 | A1 | 12/2006 | Duerck et al. |
| 2007/0002827 | A1 | 1/2007 | Lau et al. |
| 2007/0005838 | A1 | 1/2007 | Chang et al. |
| 2007/0005850 | A1 | 1/2007 | Chang et al. |
| 2007/0006235 | A1 | 1/2007 | Chang et al. |
| 2007/0011333 | A1 | 1/2007 | Lau et al. |
| 2007/0011360 | A1 | 1/2007 | Chang et al. |
| 2007/0067504 | A1 | 3/2007 | Lau et al. |

OTHER PUBLICATIONS

APT Technologies, Inc., et al., "Serial ATA: High Speed Serialized AT Attachment", *Revision* 1.0a, (Jan. 7, 2003),1-2, 184-236.

Dell Computer Corporation, et al., "Serial ATA II: Extensions to Serial ATA 1.0a", *Revision* 1.2, (Aug. 27, 2004),24-52.

Dell Computer Corporation, et al., "Serial ATA II: Extensions to Serial ATA 1.0a", Revision 1.2, (Aug. 27, 2005),103-106.

Grimsrud, Knut, et al., "Serial ATA Storage Architecture and Applications (Designing High-Performance, Low-Cost I/O Solutions)", *Intel Press, ISBN 0-9717861-8-6*, (2003),Entire Book.

Intel Corporation, "Comparing Serial ATA Native Command Queing (NCQ) and ATA Tagged Command Queuing (TCQ)", *The Advantage of Serial ATA Native Command Queuing*, (Oct. 2003),1-4.

Sata-IO Board Members, et al., "Serial ATA International Organization: Port Multiplier", *Revision* 1.2, (Jan. 27, 2005),1-38.

"U.S. Appl. No. 11/172,627, Office Action", (Sep. 20, 2007), 19 pages.

Intel Corporation, "Serial ATA II Native Command Queuing Overview, Application Note", www.intel.com/design/storage/papers/252664.htm, retrieved on Nov. 28, 2006,(Apr. 30, 2004),the whole document.

PCT/US2006/025461 International Search Report, 1 page, Dec. 18, 2006.

"PCT/US2006/025462 Search Report", (Nov. 14, 2006),2 pages.

"PCT/US2006/025750 Search Report", (Apr. 23, 2007),2 pages.

"PCT/US2006/025753 Search Report", 2 pages Nov. 20, 2006.

Dell Computer Corporation, et al., "Serial ATA II: Extensions to Serial ATA 1.0a", *Serial ATA Extensions Workgroup, XP-002414889*, (Aug. 27, 2004),pp. 22-32.

Intel Corporation, et al., "Serial ATA Native Command Queuing", XP-002428259, Joint Whitepaper by Intel Corporation & Seagate Technology,(Jul. 2003),the whole document (12 pages).

LSI Logic Corporation, "LSISAS1064 4-Port 3Gbit/s Serial Attached SCSI Controller", Data Sheet, XP002404785 USA, www.lsi.com/files/docs/techdocs/storage_stand_ prod/sas/1064.ds.pdf, (Mar. 29, 2005), pp. 1-30.

LSI Logic Corporation, "LSISASx12 3.0 Gbits/s Serial Attached SCSI Expander", Data Sheet, XP002404784 USA, www.lsilogic.com/files/docs/techdocs/storage_stand_prod/sas/sasx12_ds.pdf, (Feb. 3, 2005), pp. 1-26.

U.S. Appl. No. 11/172,627, Final Office Action (May 1, 2008) 13 pgs.

U.S. Appl. No. 11/172,627, Office Action (Oct. 10, 2008) 16 pgs.

U.S. Appl. No. 11/172,627, Final Office Action (Sep. 22, 2009) 21 pgs.

"U.S. Appl. No. 11/172,627 Office Action", (Sep. 20, 2007), 19 pages.

* cited by examiner

HARDWARE ORIENTED HOST-SIDE NATIVE COMMAND QUEUING TAG MANAGEMENT

BACKGROUND

1. Field

Embodiments of the invention relate to the field of computer systems architecture. More specifically, embodiments of the invention relate to the field of command queuing.

2. Background Information

Native Command Queuing (NCQ) is an optional feature described, for example, in the document Serial ATA II: Extensions to Serial ATA 1.0a, and related documents. In brief, NCQ may allow a target device to accept multiple outstanding commands from an initiator device, and to optimize or otherwise re-order the execution of those commands.

The commands in NCQ may include a tag value that may identify the command. Conventionally, much of the processing of the NCQ tag on the host-side is implemented in application layer software or firmware, such as, for example, a driver that is executed by a host-side processor. One potential problem with such an implementation is that the software or firmware may tend to increase the load on the processor, or otherwise limit performance.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

I. Exemplary Computer Systems Architecture

Figure 1:
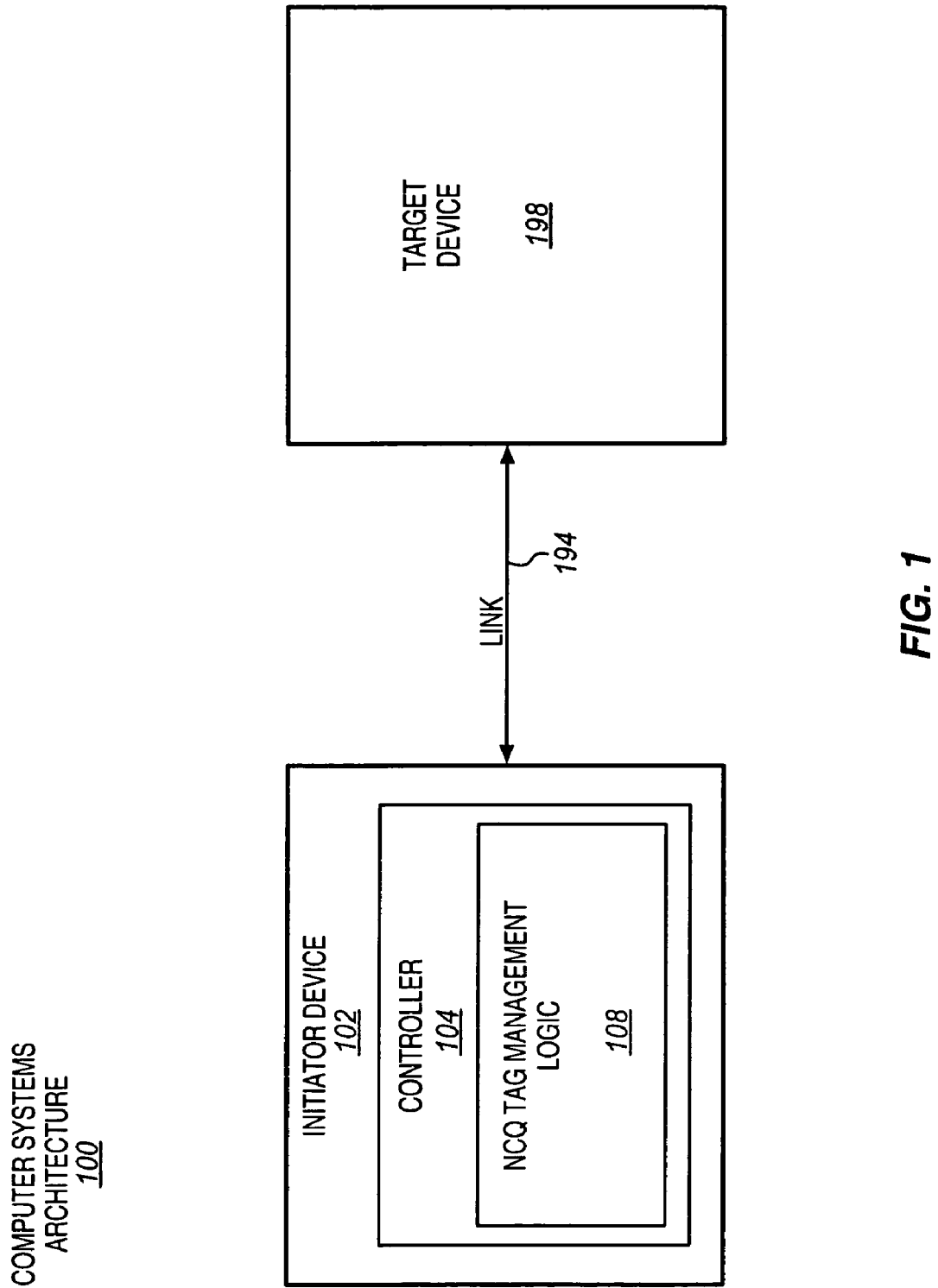
FIG. 1 is a block diagram showing a computer systems architecture including NCQ tag management logic, according to one or more embodiments of the invention.

FIG. 1 is a block diagram showing a computer systems architecture 100 including Native Command Queuing (NCQ) tag management logic 108, according to one or more embodiments of the invention. The architecture includes an initiator device 102, a link 194, and a target or target device 198. The initiator device is coupled with, or otherwise in communication with, the target device via the intervening link.

Suitable initiator devices include, but are not limited to, Serial Advanced Technology Attachment (SATA) initiators and Serial Tunneling Protocol (STP) type Serial Attached SCSI (SAS) initiators. Suitable SATA initiators and STP initiators include, but are not limited to, servers, desktop computers, laptop computers, and other computer systems known in the arts, other network devices, and networks including such computer systems or devices. The initiator device may sometimes also be referred to as a host device.

Suitable targets include, but are not limited to, SATA devices, STP ports, STP devices, storage networks, fibre channel networks, and the like. In one or more embodiments of the invention, the target may include a storage device, such as, for example, a hard disk drive, optical disk drive, or ATAPI drive, to name just a few examples, although the scope of the invention is not limited in this respect.

As shown, the initiator device may include a controller 104. In one aspect, the controller may be included within a primary housing or chassis of the initiator device, such as, for example, connected to a motherboard. Alternatively, the controller may be external to the housing or chassis, such as, for example, in a Host Bus Adapter (HBA) card that may be inserted into a card slot, or in a docking station, etc. These are just a few possibilities. The scope of the invention is not limited in respect to the relative physical locations of the controller and initiator device.

The initiator and target devices may communicate or exchange signals via the controller. For example, the initiator device may issue commands, such as, for example, data transfer commands, and the target device may cooperate with the initiator device to execute the commands.

As shown, according to one or more embodiments of the invention, the controller may include NCQ tag management logic 108. NCQ may allow the target device to accept multiple commands from the initiator device, and to re-order the execution of the received commands. The commands may include read, write, or other data transfer commands, for example. The target device may potentially optimize the order in which the commands are executed based on local information, such as, for example, in some cases, disk rotation position, and/or other target-side information, although the scope of the invention is not limited in this respect. The target device may then participate in out-of-order execution of the commands. Such re-ordering of commands may potentially offer improved performance for a highly queued workload, for example in a storage network, where multiple simultaneous commands may be outstanding. However, the scope of the invention is not limited in this respect.

In NCQ, the commands may each include an NCQ tag that may identify the command. In one or more embodiments of the invention, the NCQ tag management logic may include logic to manage the NCQ tags of the commands to perform functions such as, for example, one or more of NCQ tag generation and assignment, NCQ tag to task context index mapping, providing context switching assistance, and/or other NCQ tag processing. In one or more embodiments of the invention, the NCQ tag management logic may be hardware oriented and may include memories, state machines, other circuitry, or other hardware to perform one or more or substantially all of such initiator-side NCQ tag management or manipulation functions.

As one example, as will be explained further below, in one or more embodiments of the invention, host-side assignment of NCQ tags for new commands prior to issuance may be at least partially or completely hardware oriented or aided. As another example, in one or more embodiments of the invention, host-side NCQ tag to TCI mapping to facilitate or assist context switching may be at least partially or completely hardware oriented or aided. As yet another example, in one or more embodiments of the invention, the building of the most recent received TCI table, such as, for example, of most recent received Direct Memory Access (DMA) Setup Frame Information Structure (FIS), may be at least partially or completely hardware oriented or aided. As a still further example, in one or more embodiments of the invention, Status Register FIS processing to suspend input and/or output from the same remote node in error conditions may be at least partially or completely hardware oriented or aided.

Hardware orientation may offer certain potential advantages over a software or firmware implementation. For example, a software-driven context-based design may tend to involve frequent memory accesses and/or significant involvement of the host-side processor for switching contexts in queuing based commands. The use of hardware may tend to reduce the overhead due to the software, and/or tend to reduce the load on the initiator-side processor(s), and/or tend to otherwise improve NCQ processing performance. Accordingly, in one or more embodiments of the invention, at least some, or much, or most, or all, of the typically NCQ tag management functions encountered in host-side SATA NCQ may be implemented in hardware to partially, mostly, or substantially completely isolate tag processing from the application layer so that the application layer does not need to process NCQ tag of DMA Setup FISes, Data FISes, Status Register FISes, and the like. While hardware implementation for many of such processes is disclosed herein, the scope of the invention is not limited to hardware implementation of all of such processes. Inventive aspects may lie in implementing respective ones of such NCQ tag management operations in hardware.

II. Exemplary Controller having Hardware Oriented NCQ Tag Management Unit

Figure 2:
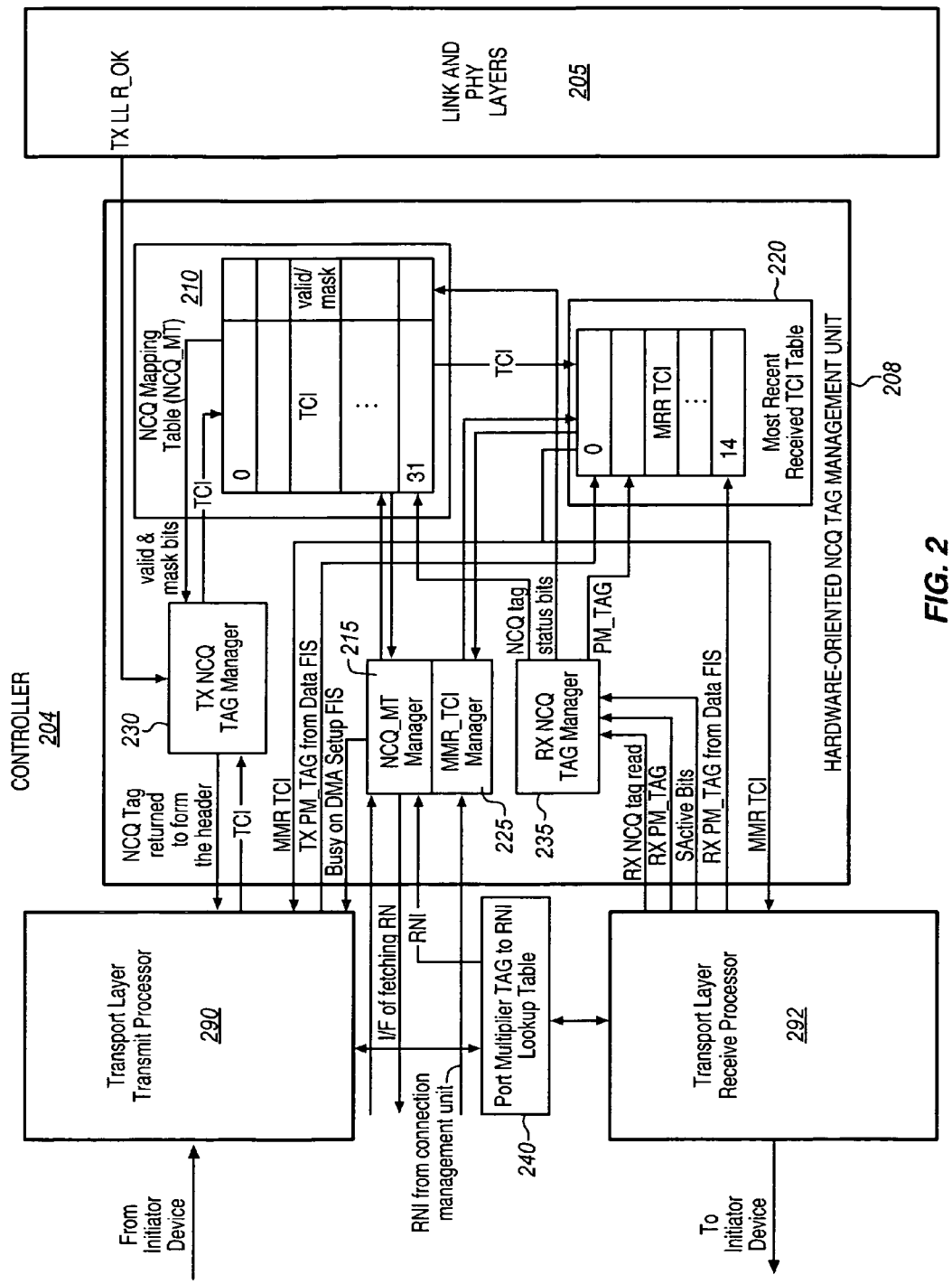
FIG. 2 is a block diagram showing a controller including a hardware oriented NCQ tag management unit, according to one or more embodiments of the invention.

FIG. 2 is a block diagram showing a controller 204 including a hardware oriented NCQ tag management unit 208, according to one or more embodiments of the invention. The controller includes an STP and/or SATA serial digital link layer control logic and serial physical interface plant 205, the hardware oriented NCQ tag management unit 208, a SATA/STP transport layer protocol engine transmit processor 290, and a SATA/STP transport layer protocol engine receive processor 292.

For convenience, the SATA/STP serial digital link layer control logic and the serial physical interface plant may also be referred to herein simply as the link and phy layers. Also, for convenience, the SATA/STP transport layer protocol engine transmit and receive processors may also be referred to herein simply as transmit and receive processors, respectively. In one or more embodiments of the invention, the transmit and receive processors may be implemented in hardware, such as, for example, to obtain hardware acceleration. Hardware implemented transmit and receive processors, according to one or more embodiments of the invention, are disclosed in co-pending U.S. patent application Ser. No. 11/172,768, entitled "SERIAL ATA PORT ADDRESSING", filed on Jun. 30, 2005, by Naichih Chang et al., and assigned to the assignee of the present invention. Alternatively, in one or more embodiments of the invention, the transmit and receive processors may be implemented in software.

The hardware oriented SATA NCQ tag management unit is logically coupled between, or otherwise in communication between, the link and phy layers, and the transport layer transmit and receive processors. The illustrated hardware oriented NCQ tag management unit includes an NCQ mapping table (NCQMT) 210, NCQ mapping table manager (NCQ_MT manager) 215, most recent received TCI (MRR_TCI) table 220, MMR_TCI table manager (MMR_TCI Manager) 225, transmit (Tx) NCQ tag manager 230, and receive (Rx) NCQ tag manager 235.

The controller also includes a port multiplier (PM) tag to remote node index (RNI) lookup table 240. The PM tag to RNI lookup table may also be referred to herein as a PM tag to RNI mapping table. In one or more embodiments of the invention, the PM tag to RNI lookup table may be implemented in hardware, such as, for example, to obtain hardware acceleration. Embodiments of such hardware implemented PM tag to RNI lookup tables are disclosed in co-pending U.S. patent application Ser. No. 11/170,848, entitled "PORT MULTIPLIER MAPPING APPARATUS SYSTEMS AND METHODS", by Naichih Chang et al., and assigned to the assignee of the present invention. Alternatively, in one or more embodiments of the invention, the PM tag to RNI lookup table may be implemented in software.

In the illustration, arrowed lines may represent signal lines, buses, other interconnects, or other signaling pathways, or other communications or interactions between the components, such as, for example, communications or interactions with software or firmware. Exemplary data flows are shown with the arrowed lines. This is just one possible configuration. The scope of the invention is not limited to just this configuration.

The components of the controller, their characteristics, their operations, and their interactions, will now be explained in greater detail via detailed working examples for procedures commonly employed in a SATA NCQ environment. In particular, in the following sections, examples will be described to illustrate how the components interact to: (a) assign NCQ tags for commands; (b) process DMA Setup FIS; (c) process Data FIS; and (d) process status information.

III. Assigning NCQ Tags

Figure 3:
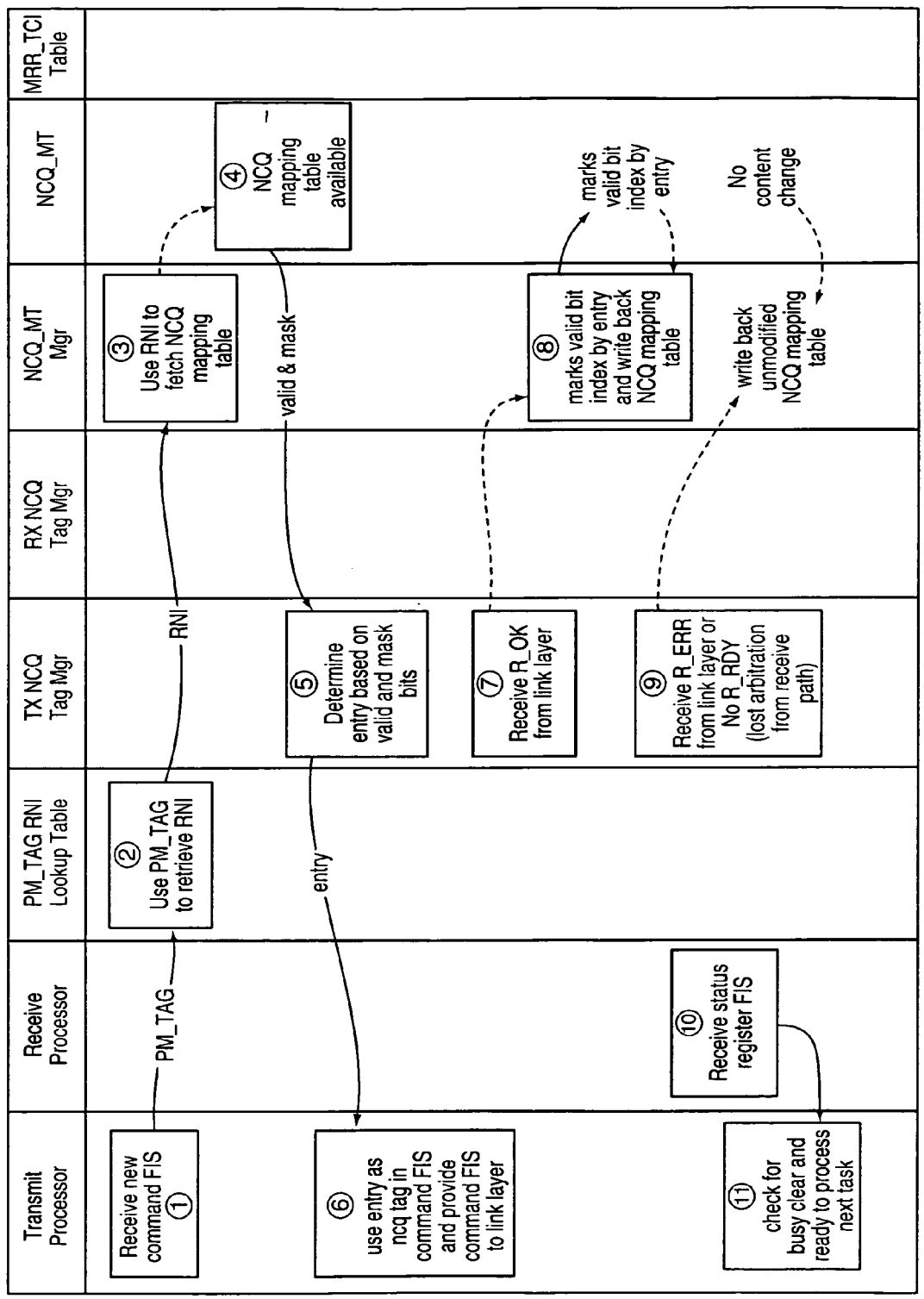
FIG. 3 shows data flows and operations within components of a controller when assigning NCQ tags to new commands, according to one or more embodiments of the invention.

FIG. 3 shows data flows and operations within components of a controller when assigning NCQ tags to new commands, according to one or more embodiments of the invention.

As shown at numeral (1), the transmit processor may receive a new command, such as, for example, from an application layer. The new command may have associated therewith a PM tag. The transmit processor may determine and provide the PM tag to the PM tag to RNI lookup table.

As shown at numeral (2), the PM tag to RNI lookup table may use the PM tag to lookup or otherwise determine a corresponding or indicated RNI. The RNI may be forwarded or otherwise provided to the NCQ mapping table manager.

As shown at numeral (3), the NCQ mapping table manager may fetch or otherwise obtain the context that is addressed by the RNI to the NCQ mapping table. In one aspect, the context may be obtained from a main memory of the host device and may be stored in a dedicated memory of the controller, such as, for example, a register or SRAM or other type of memory known in the arts, that may be used to implement a hardware implement NCQ mapping table.

As shown at numeral (4), the NCQ mapping table may receive the context. The NCQ mapping table may have fields or other logical storage locations to store task context index (TCI) per NCQ tag along with 'valid' and 'mask' bits within a remote node. As shown, since SATA allows supporting up to 32 outstanding commands, the NCQ Mapping Table may be logically divided into 32 storage locations, although the invention is not so limited. Each of the storage locations may correspond to and be indexed or indicated by a different NCQ tag. For example, the binary format NCQ tag 11111 may correspond to and index the 32nd storage location. Each of the storage locations may store TCI along with valid and mask bits associated with the command indicated by the corresponding NCQ tag.

In one or more embodiments of the invention, the valid bits may be used to indicate whether or not issuance of a command having the NCQ tag value has been issued and/or acknowledged. According to one of two possible conventions, the valid bits may be set when the command having the NCQ tag value has been issued and/or acknowledgement of receipt of the issued command has been received from the target device. Likewise, the valid bit may be cleared if the command having the NCQ tag value has not been issued and/or no acknowledgement has been received from the target device. This is just one possible convention. In any event, the valid information in the NCQ mapping table may include information indicating whether commands are one or more of issued, pending, queued, outstanding, and/or not completed.

As an option, the target device may potentially have the capability to notify the initiator device of a supporting limited number of queued commands, which may be less than 32 queued commands. For example, the target device may specify a queue depth in word 75 of identify device information. In such cases, the mask bits may optionally be assigned a predetermined value, such as, for example, they may be set, for the unused entries. By way of example, this may be achieved by firmware or hardware, depending on the programmable register. Then, NCQ tags may not be assigned for entries whose mask bits have been set. Again, this is only one possible convention.

As shown at numeral (5), the transmit NCQ tag manager is in communication with the NCQ mapping table, may access the NCQ mapping table, and may receive valid and mask information or bits from the NCQ mapping table. The transmit NCQ tag manager may include circuitry, such as, for example, one or more state machines, or other logic to examine the valid and mask information and to select, determine, and/or assign NCQ tags based, at least in part, on the examination or processing of the valid and mask information.

In one or more embodiments of the invention, the transmit NCQ tag manager may utilize an algorithm to assign NCQ tags. As one example, the algorithm may start with the last entry that was used to assign an NCQ tag, and may proceed through the entries in a predetermined order, such as, for example, in a forward order, until an entry is identified to be available. According to the previously described convention, an entry may have cleared valid and mask bits or information. This may indicate that a command having the corresponding NCQ tag value has not been issued and/or acknowledged by the target device. The logic may select the entry with the cleared valid and mask bits as an NCQ tag for the new command. If the end of the order is reached, the algorithm may loop back to the beginning of the order and resume, until an entry is available. The available entry, when determined, may correspond to the NCQ tag that is assigned. This is just one possible algorithm. Other algorithms based on skipping entries, randomly jumping through the entries, and the like are also contemplated. The transmit NCQ tag manager may provide the entry as the NCQ tag value to the transmit processor.

As shown at numeral (6), the transmit processor may be in communication with the transmit NCQ tag manager and may receive the selected entry. The transmit processor may include transport layer logic to use the entry as an NCQ tag in a command FIS. For example, the transmit processor may insert the NCQ tag value corresponding to the selected entry in the tag field in the command FIS. Then, the transmit processor may provide the command FIS including the NCQ tag to the link layer.

The command FIS may be transmitted to the device and acknowledged by the device. For example, the device may acknowledge the command FIS by providing an R_OK primitive, which may be received by the link layer of the controller.

As shown at numeral (7), the transmit NCQ tag manager may receive notice of the acknowledgement. The transmit NCQ tag manager may include circuitry or other logic to change the valid bit in the NCQ mapping table, update the TCI in the entry corresponding to the NCQ tag for the acknowledged command, and inform the NCQ mapping table manager to write back the context from the NCQ mapping table back to the location that is indexed or indicated by the remote node index. In changing the valid bit, according to one possible convention, the bit, which may initially be cleared, may be set. Setting the bit may indicate that issuance of a command having the NCQ tag corresponding to the valid bit has been acknowledged by the target device. As shown at numeral (8), the NCQ mapping table may write back the context from the NCQ mapping table.

Acknowledgement may not always occur. In some cases, errors may be reported. For example, the controller may receive an R_ERR signal. In other cases, there may be problems with arbitration. For example, no R_RDY signal may be received.

As shown at numeral (9), when such errors or problems with arbitration are encountered, the transmit NCQ Tag Manager may not mark the valid bit, and may inform the NCQ mapping table manager to write back the unmodified context of the NCQ mapping table.

As shown at numeral (10), at a later time, the receive processor may receive a Status Register FIS with the busy bit cleared (for example bit 7 in the status field cleared). As shown at numeral (11), the transmit processor may check or otherwise determine that the busy bit status has been cleared, and may then proceed to issue one or more other commands.

IV. DMA Setup FIS Processing

Figure 4:
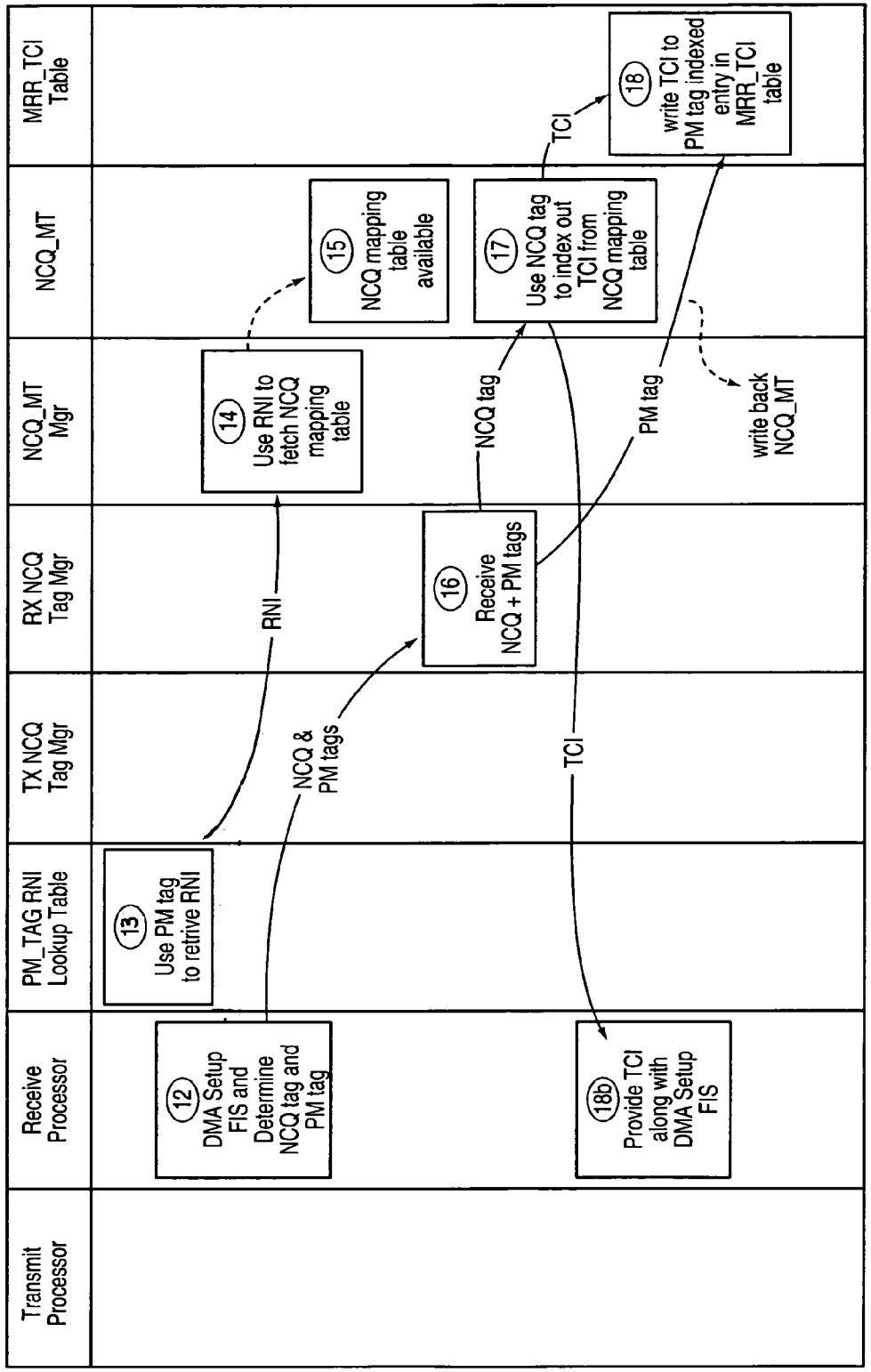
FIG. 4 shows data flows and operations within components of a controller when processing a DMA Setup FIS, according to one or more embodiments of the invention.

FIG. 4 shows data flows and operations within components of a controller when processing a DMA Setup FIS, according to one or more embodiments of the invention.

As shown at numeral (12), the receive processor, may receive a DMA Setup FIS. The receive processor may determine both a PM tag and NCQ tag from the DMA Setup FIS, such as, for example, by parsing the DMA Setup FIS. In one or more embodiments of the invention, if a port multiplier is not attached, the PM tag may have a value of 0 by convention. The receive processor may provide the PM tag to the port multiplier tag to RNI lookup table to retrieve RNI corresponding to or indicated by the PM tag.

As shown at numeral (13), the port multiplier tag to RNI lookup table may use the PM tag to lookup or otherwise retrieve or obtain a corresponding or indicated RNI. The RNI may be provided to the NCQ mapping table manager.

As shown at numeral (14), the NCQ mapping table manager may use the RNI to fetch or otherwise obtain the context that is addressed by the RNI to the NCQ mapping table. In one or more embodiments of the invention, fetching the table may include receiving context information and storing the received context information in a dedicated memory, such as, for example, a register, SRAM, or other type of memory. As shown at numeral (15), the NCQ mapping table may receive the context.

As shown at numeral (16), the receive NCQ tag manager may receive both the NCQ tag and the PM tag from the receive processor. The receive NCQ tag manager may provide the NCQ tag to the NCQ mapping table to index out or otherwise determine the corresponding TCI for the DMA Setup FIS. The TCI is the address of context for an input and/or output data transfer. The task context may be used to process the input and/or output data transfer. Each such data transfer may have a unique task context associated with it. The task context may include information such as, for example, starting LBA, input and/or output block size, input and/or output transfer count, current LBA, remaining transfer count, input and/or output status (for example command transmitted, busy bit cleared, device ready bit set, etc), control information, etc.

The receive NCQ tag manager may also provide the PM tag to the most recent received TCI table to allow the TCI obtained from the NCQ mapping table to be written to the PM tag indexed or indicated entry in the most recent received TCI table. As shown at numeral (17), the NCQ mapping table may receive the NCQ tag. The NCQ tag may index the corresponding TCI. The TCI may be provided to the most recent received TCI table.

As shown at numeral (18), the most recent received TCI table may receive the TCI from the NCQ mapping table and may receive the PM tag from the receive NCQ tag manager. The TCI may be written to the PM tag indexed entry in the most recent received TCI table. The most recent received TCI table may store TCI corresponding to the most recent received DMA Setup FIS per PM tag if a port multiplier is included. As previously discussed, an entry of zero may optionally be used if a port multiplier is not included. Therefore, naturally entry 0 of the most recent received TCI table may be used for non-PM cases. The most recent received TCI table may be accessed initially upon STP connection open or close.

The most recent received TCI table may be used for both transmit and receive Data FIS processing. The most recent received TCI table may be stored along with the remote node context of a STP/SATA bridge in SAS environment and may subsequently be accessed and used to reconnect to the STP/SATA bridge. The most recent received TCI table manager may then fetch or obtain the most recent received TCI table from the STP/SATA bridge remote node context after an STP connection is open to the designated STP/SATA bridge. The table manager may write the content back to the STP/SATA bridge remote node context after the connection is closed. The remote node index of the STP/SATA bridge may be provided by an STP connection management unit, for example, although the scope of the invention is not limited in this respect. The most recent received TCI table manager may optionally be activated upon the opening and/or closing of a connection to the STP/SATA bridge. The most recent received TCI table manager may optionally share remote node context request logic with the NCQ mapping table manager or alternatively separate logics may be used. For directly attached cases, such as, for example, non-STP environments, there may be no connection requirement, so that the most recent received TCI table may reside in the hardware persistently.

Referring again to the illustration, as shown at numeral (18b), the TCI may be returned to the protocol processor (for example via signal MRR TCI) for data processing preparation along with transfer count and buffer offset from DMA Setup FIS.

Figure 5:
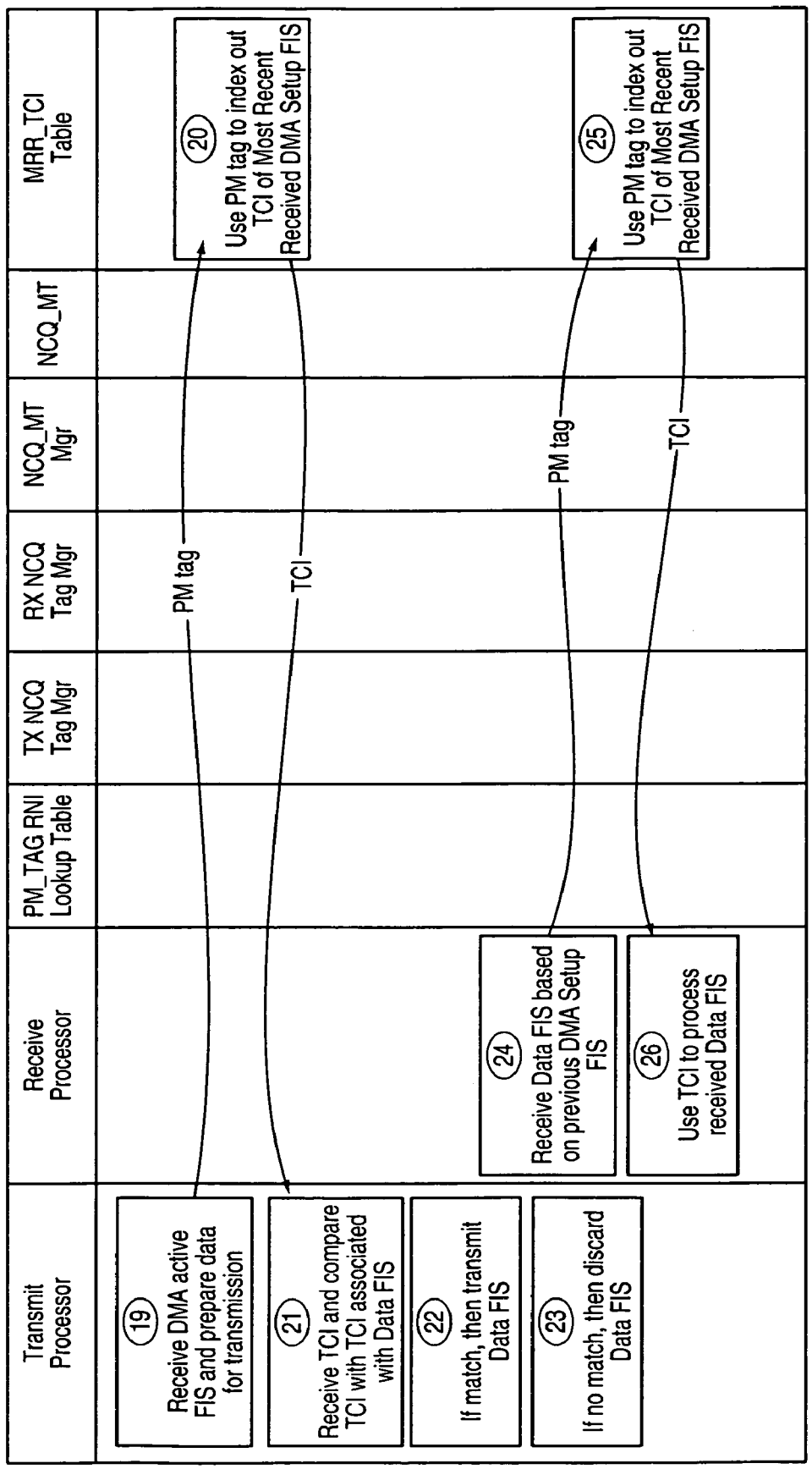
FIG. 5 shows data flows and operations within components of a controller when processing a Data FIS, according to one or more embodiments of the invention.

V. Data FIS Processing:

FIG. 5 shows data flows and operations within components of a controller when processing a Data FIS, according to one or more embodiments of the invention. The controller may both transmit Data FIS, as will be discussed first, and receive Data FIS, as will be discussed next.

As shown at numeral (19), the transmit processor may receive a DMA Active FIS and prepare data for transmission. The transmit processor may parse the FIS to determine a PM tag. The transmit processor may provide the PM tag to the most recent received TCI table to index out the TCI of the most recent received DMA Setup FIS.

As shown at numeral (20), the most recent received TCI table may receive the PM tag and may use the PM tag to index out the TCI of the most recent received DMA Setup FIS. The TCI may be provided back to the transmit processor.

As shown at numeral (21), the transmit processor may receive the TCI. The transmit processor may compare the received TCI with TCI associated with the Data FIS.

In some cases, the comparison may indicate that the TCIs match. In such cases, as shown at numeral (22), the transmit processor may transmit or otherwise provide the Data FIS to the link layer so that the Data FIS may be provided to the target device.

In other cases, the comparison may indicate that the TCIs do not match. For example, this may potentially occur when the host device receives multiple back-to-back DMA Setup FISes from the same target device or remote node. The host device may service the latest received DMA Setup FIS. In such cases, as shown at numeral (22), the transmit processor may abort the current Data FIS and discard the previously fetched data associated with the Data FIS.

Reception of Data FISes will now be discussed. As shown at numeral (24), the receive processor may receive a Data FIS based on a previous DMA Setup FIS. The receive processor may parse the Data FIS to determine a PM tag. The receive processor may provide the PM tag to the most recent received TCI table.

As shown at numeral (25), the most recent received TCI table may receive the PM tag and may use the PM tag to index out the TCI of the most recent received DMA Setup FIS. The TCI may be provided back to the receive processor.

As shown at numeral (26), the receive processor may receive the TCI. The TCI may be used to process the previously received Data FIS.

VI. Status Processing

After the target device has finished the input and/or output request, the device may provide a status signal, such as, for example, a Set Device Bits FIS, to the controller. The Set Device Bits FIS may have bits set in the DWORD 1 register or SActive field corresponding to the bit position for each completed NCQ command tag to indicate completed status, although the scope of the invention is not so limited. For instance, if the command corresponding to NCQ tag 2 has been completed without errors, then bit 2 of SActive field may be set and the error fields may be all zeros.

Figure 6:
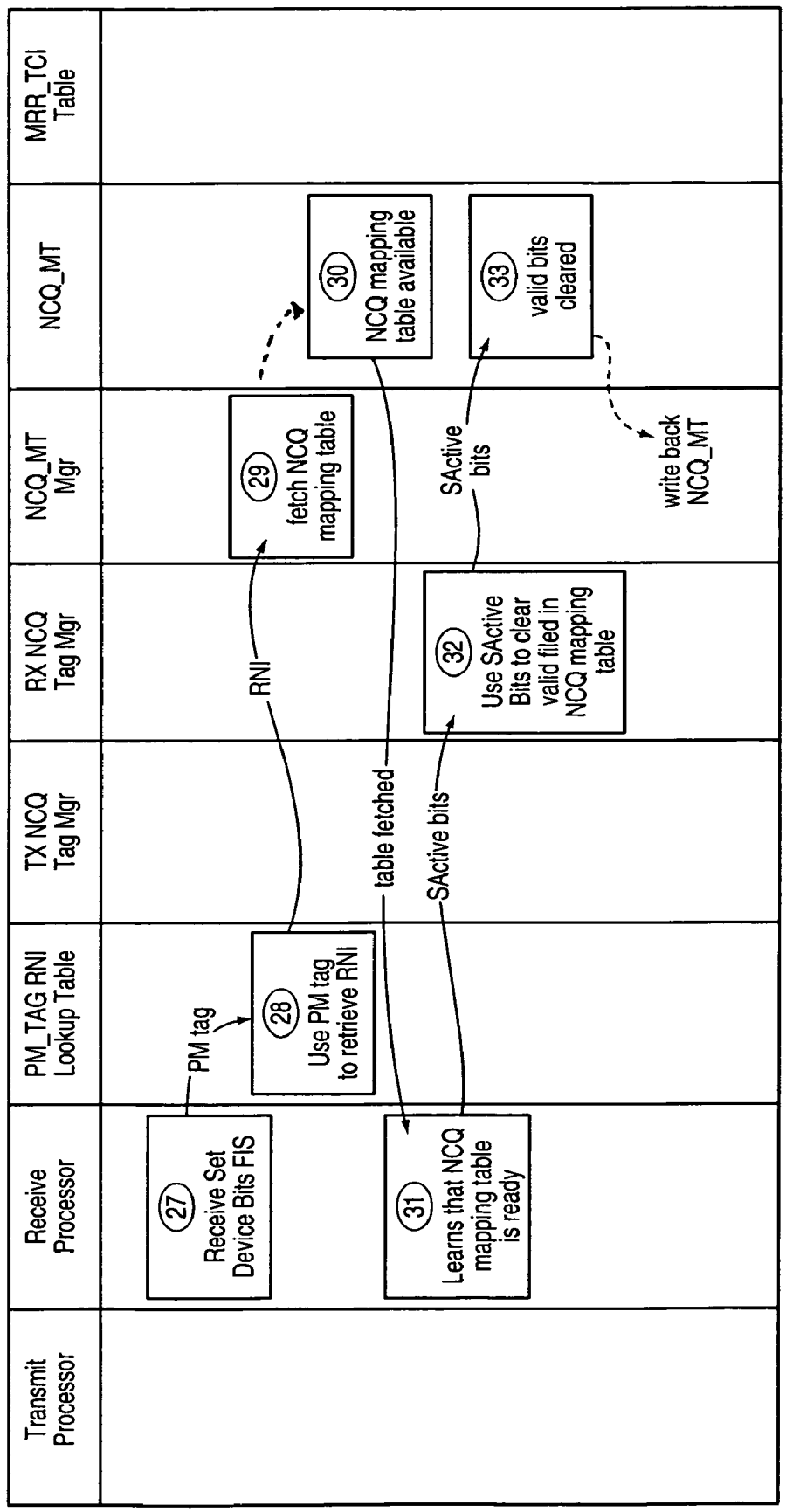
FIG. 6 shows data flows and operations within components of a controller when processing status, according to one or more embodiments of the invention.

FIG. 6 shows data flows and operations within components of a controller when processing status, according to one or more embodiments of the invention.

As shown at numeral (27), the receive processor may receive a Set Device Bits FIS. The receive processor may parse the Set Device Bits FIS to determine a PM tag. The receive processor may provide the PM tag to the port multiplier tag to RNI lookup table.

As shown at numeral (28), the port multiplier tag to RNI lookup table may receive the PM tag and may use the PM Tag to lookup or otherwise determine a corresponding RNI. The RNI may be passed or otherwise provided to the NCQ mapping table manager.

As shown at numeral (29), the NCQ mapping table manager may receive the RNI. The NCQ mapping table manager may use the RNI to fetch or otherwise obtain the context that is addressed by the RNI to the NCQ mapping table. As shown at numeral (30), the NCQ mapping table may receive the context.

As shown at numeral (31), after the context has been provided to the NCQ mapping table, the receive processor may receive an indication that the NCQ mapping table has been fetched or is ready, and the receive processor may pass the SActive bits from the Set Device Bits FIS to the receive NCQ tag manager.

As shown at numeral (32), the receive NCQ tag manager may receive the SActive bits and may use the SActive bits to clear or otherwise modify one or more values of one or more of the bits in the valid field or location in the NCQ mapping table based at least in part on the status information. Multiple bits may be cleared or otherwise modified using one Set Device Bits FIS. As shown at numeral (33), the valid bits in the NCQ mapping table may be cleared. Then, the NCQ mapping table may be written back to the NCQ mapping table manager.

VII. NCQ Mapping Table Access

The NCQ mapping table manager may include logic to arbitrate for access to the NCQ mapping table in order to perform various actions, such as, for example, transmitting new command FIS, receiving DMA Setup FIS, transmitting Data FIS, receiving Status Register FIS, and the like.

One situation that may potentially occur is substantially simultaneous or at least concurrent reception of a DMA Setup FIS and transmission of a command FIS. In such a situation, according to one or more embodiments of the invention, access to the NCQ mapping table to perform the DMA Setup FIS processing may have higher arbitration priority than transmission of the command FIS. If the command FIS for transmission is associated with a different remote node than the received DMA Setup FIS, then the command FIS may be suspended temporarily pending authorization from the NCQ mapping table manager. Alternatively, if the command FIS is associated with the same remote node as the DMA Setup FIS, then the command FIS may be aborted. That is, the host device may service the received DMA Setup FIS without issuing new commands to the same target device. Then, transmission of the command FIS may be re-attempted after the data transmission associated with the DMA Setup FIS has been completed.

Another situation that may potentially occur is substantially simultaneous or at least concurrent reception status information, such as, for example, a Set Device Bits FIS, and transmission of a command FIS. The Set Device Bits FIS may either indicate non-error status (for example error fields are all zeros) or error status (for example error fields are not all zeros). In one or more embodiments of the invention, arbitration or access priorities to the NCQ mapping table in such situations may depend, at least in part, on the error status of the Set Device Bits FIS. For example, in one or more embodiments of the invention, if non-error status is reported in the Set Device Bits FIS, then the NCQ mapping table manager may allow either one of the processes ownership of and access to the NCQ mapping table. Further, in one or more embodiments of the invention, if error status is reported, then the NCQ mapping table manager may allow the status processing to have priority for ownership of and access to the NCQ mapping table.

If the command FIS is associated with the same target device as the error status of the Set Device Bits FIS, then the transmission of the command FIS may be aborted and await error clean up and recovery. Alternatively, if the command FIS is associated with a different target device than the error status of the Set Device Bits FIS, then the transmission of the command FIS need not be aborted but may await grant from the NCQ mapping table manager.

The NCQ mapping table manager may also suspend transmit Data FIS processing when the NCQ mapping table is involved with a received DMA Setup FIS. The transmission of the Data FIS may await an update of the most recent received TCI table before checking the TCI.

The NCQ mapping table manager may allow the transmission of the Data FIS to proceed normally or as described above when the NCQ mapping table is involved with a received non-error status. Alternatively, if there is error status, the transmission of the Data FIS may await error clean up and recovery processing before deciding whether to be aborted or be issued.

Now, details of a particular set of NCQ tag management logic have been provided in order to illustrate certain concepts. However, the scope of the invention is not so limited.

In one or more alternate embodiments of the invention, multiple NCQ mapping tables (not shown) may optionally be provided. As one example, multiple NCQ mapping tables may be provide one per device attached behind a SATA port multiplier. Each of the NCQ mapping tables may correspond to a different device behind the port multiplier. Additionally, if the remote node contexts of all devices, including any potential devices attached behind a SATA port multiplier, are accessible locally, such as, for example, by including a sufficient number of NCQ mapping tables, then there may be no need to fetch or obtain an NCQ mapping table. Rather, the NCQ mapping table manager may simply select an appropriate NCQ mapping table of the plurality of locally available NCQ mapping tables having the corresponding remote node context.

VII. Exemplary Initiator Device

Figure 7:
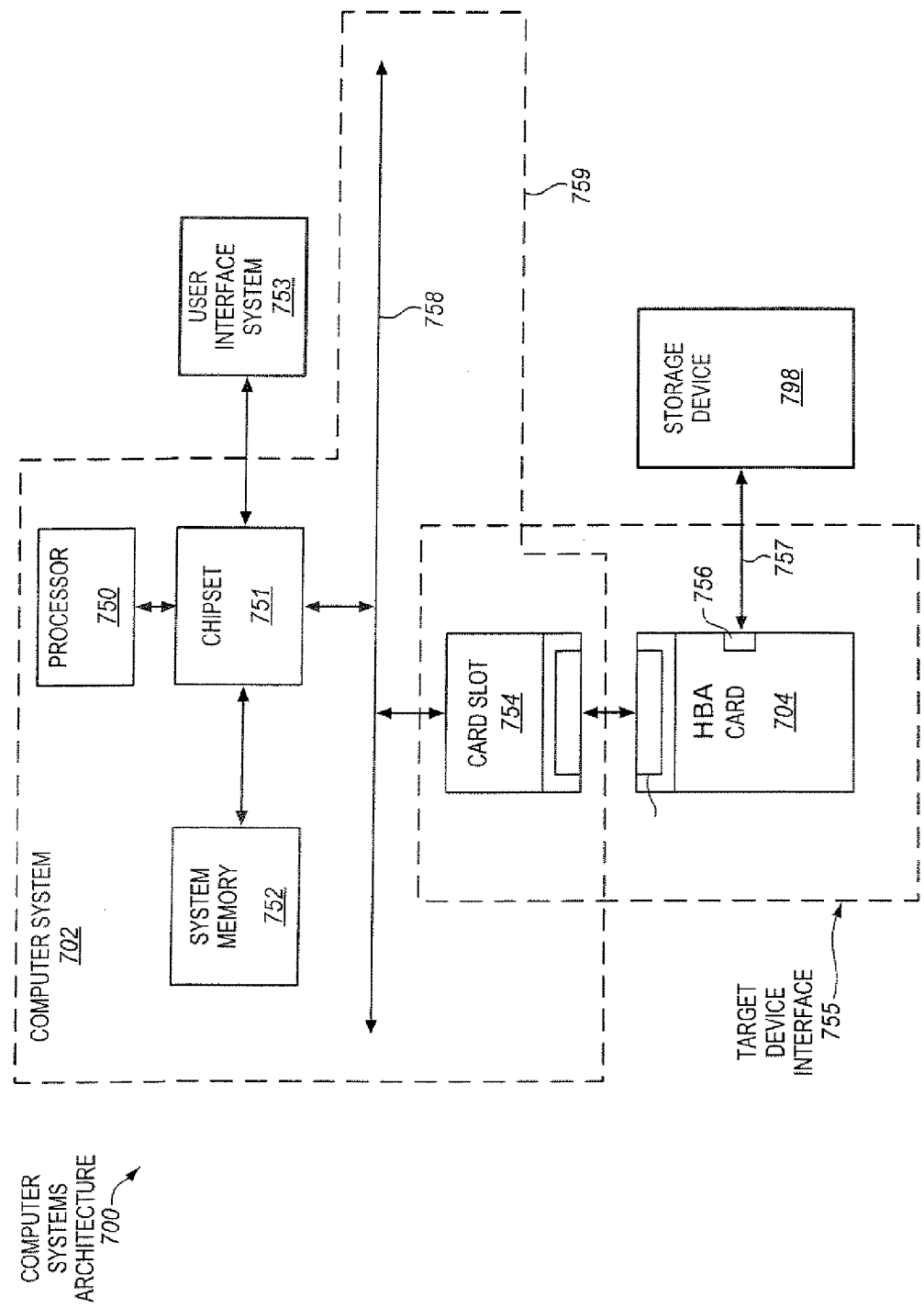
FIG. 7 is a block diagram showing a computer architecture including a computer system that is suitable as an initiator or host device, according to one or more embodiments of the invention.

FIG. 7 is a block diagram showing a computer architecture 700 including a computer system 702 that is suitable as an initiator device, according to one or more embodiments of the invention. The architecture also includes a user interface system 753, a storage device or other target device 798, and a target device interface 755 to allow the computer system to interface with the target device, according to one or more embodiments of the invention.

The computer system is one example of a suitable host device, although other host devices are also suitable. As used herein, a "computer system" may include an apparatus having hardware and/or software to process data. The computer system may include, but is not limited to, a server, desktop, portable, laptop, or mainframe computer, to name just a few examples.

The computer system includes a processor 750 to process information. In one or more embodiments, the processor may include a processor in the Pentium® family of processors, such as, for example, a Pentium® 4 processor. The Pentium® family of processors are commercially available from Intel Corporation, of Santa Clara, Calif. Alternatively, other processors may optionally be used. As one example, a processor having multiple processing cores may be used. Further, in one or more embodiments, the computer system may include multiple processors.

The processor is coupled with a chipset 751 by an interface. A system memory 752, a user interface system 753, and one or more input/output (I/O) buses or other interconnects 758, are each additionally coupled with, or otherwise in communication with the chipset by respective interfaces.

In one or more embodiments of the invention, the chipset may include one or more integrated circuits or other microelectronic devices, such as, for example, those that are commercially available from Intel Corporation. For example, in one or more embodiments of the invention, the chipset may include a first bridge/hub (not shown), such as, for example, a memory control bridge/hub available from Intel Corporation, and a second bridge/hub (not shown), such as, for example, an input/output (I/O bridge/hub available from Intel Corporation. In one or more other embodiments, at least a portion of the memory control bride/hub, such as, for example, the memory controller, may be in the same chip as the processor. The first bridge/hub may be coupled with the second bridge/hub by a hub interface. However, the scope of the invention is not limited to such chipsets.

The system memory may be coupled with, or in communication with, the memory control bridge/hub. In one or more embodiments of the invention, the system memory may include a main memory, such as, for example, a random access memory (RAM) or other dynamic storage device, to store information including instructions to be executed by the processor. Different types of RAM memory that are included in some, but not all computer systems, include, but are not limited to, static-RAM (SRAM) and dynamic-RAM (DRAM). Other types of RAM that are not necessarily dynamic or need to be refreshed may also optionally be used. Additionally, in one or more embodiments of the invention, the system memory may include a read only memory (ROM) to store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

The one or more I/O interconnects and the user interface system may be coupled with, or otherwise in communication with, the I/O bridge/hub. Suitable I/O interconnects include, but are not limited to, peripheral component interconnect (PCI) family buses, accelerated graphics port (AGP) buses, universal serial bus (USB) buses, low pin count (LPC) buses, other kinds of I/O buses, or combinations thereof. In one particular embodiment of the invention, the one or more I/O interconnects may include a PCI, PCIX (PCI extended), and/or PCI-Express (PCI-E) bus. The chipset and the I/O bridge/hub may accordingly support standard I/O operations on one or more of such I/O interconnects.

The user interface system may representatively include devices, such as, for example, a display device, a keyboard, a cursor control device, and combinations thereof, although the scope of the invention is not limited in this respect. For example, some computer systems, such as servers, may optionally employ simplified user interface systems.

As shown in the illustrated embodiment, the target device interface 755 may be coupled with the one or more I/O interconnects 758, such as, for example, the PCI/PCI-X bus. The one or more interconnects may be used to communicate information among components.

The illustrated target device interface includes a card slot 754 and a card 704, although the scope of the invention is not limited in this respect. The card slot is coupled with, or otherwise in communication with, the one or more I/O interconnects. The slot and the card may be constructed to permit the card to be inserted into the slot and electrically coupled with the card slot to allow the card to be coupled with, or otherwise in communication with, the one or more I/O interconnects. The card may become electrically coupled with the one or more I/O interconnects and may exchange data and/or commands with the system memory, the host processor, and/or other components of the computer system.

In one or more embodiments of the invention, the card may include a controller and/or hardware oriented SATA NCQ tag management logic as disclosed elsewhere herein in order to allow the computer system and the target device to communicate with and interact with one another.

The target device may be coupled with the target device interface, for example the card, via a communication link 757, such as, for example, a serial interface. One target device is coupled in the illustrated embodiment, although other target devices may also optionally be coupled with the card via additional links. Suitable target devices include, but are not limited to, SATA devices. Suitable SATA devices include, but are not limited to, hard drives, magnetic hard drives, pluralities of hard drives, arrays of hard drives, redundant arrays of inexpensive disks boxes, CD-ROM devices, tape drives, Zip drives, SuperDisk drives, and the like. Port selectors and/or port multipliers may also optionally be coupled between the target device and the card.

The computer system may exchange data and/or commands with the target device via the card. In one or more embodiments of the invention, a SATA communication protocol may be used.

Now, as shown in the illustrated embodiment, the processor, system memory, chipset, one or more I/O interconnects, and card slot may optionally be included on or otherwise connected to a single circuit board 759, such as, for example, a motherboard or backplane. The motherboard and the components connected thereto are often housed within a chassis or primary housing of the computer system. The user interface system and the target device may, in one or more embodiments, be outside of the chassis or primarily housing. The slot may represent an opening into the chassis or housing into which the card may be inserted. Accordingly, in the illustrated embodiment, the card is external to the chassis or primary housing.

However, this is not required. In one or more alternate embodiments of the invention, logic of the card, such as, for example, a controller and/or hardware oriented SATA NCQ tag management logic as disclosed herein, may optionally be included within the chassis or primary housing. For example, the controller or hardware oriented SATA NCQ tag management logic may be included in the chipset or integrated with the motherboard or backplane. Many additional modifications are also contemplated.

VIII. Other Matters

In the description and claims, the terms "coupled" and "connected," along with their derivatives, may be used. It should be understood that these terms are not intended as synonyms for each other. Rather, in particular embodiments, "connected" may be used to indicate that two or more components are in direct physical or electrical contact with each other. "Coupled" may mean that two or more components are in direct physical or electrical contact. However, "coupled" may also mean that two or more components are not in direct contact with each other, but yet still co-operate, communicate, or interact with each other. For example, two or more components may be coupled with one another via one or more intervening components. In addition, two or more components may be in communication with one another if they exchange data or information, regardless of whether they are in direct contact or not.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, computer systems, storage controllers, Host Bus Adapters, motherboards, docking stations, network devices, and a wide variety of other devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (e.g., a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A host bus adapter (HBA) for a host device comprising:
    a controller of the host bus adapter for the host device;
    a serial advanced technology attachment (SATA) Native Command Queuing (NCQ) tag management unit of the controller;
    a memory of the SATA NCQ tag management unit of the controller of the HBA to store information for each of a plurality of different NCQ tag values, wherein the information for each NCQ tag value indicates whether or not a command corresponding to each respective NCQ tag value has been issued; and
    an NCQ tag selection circuit of the SATA NCQ tag management unit of the controller of the HBA in communication with the memory, the NCQ tag selection circuit to examine the information in the memory and select an NCQ tag value having information that indicates that a command having the selected NCQ tag value has not been issued, and to perform host-side assignment of the selected NCQ tag value to a given command prior to issuance of the given command; and
    logic of the HBA to include the selected NCQ tag value in a command frame information structure (FIS).

2. The host bus adapter (HBA) for the host device of claim 1, further comprising a second circuit in communication with the memory, the second circuit to modify information in the memory for the selected NCQ tag value after issuance of the given command having the selected NCQ tag value.

3. The host bus adapter (HBA) for the host device of claim 1, wherein the memory comprises a dedicated memory having thirty-two storage locations to store information for thirty-two different NCQ tag values.

4. The host bus adapter (HBA) for the host device of claim 1, wherein the memory comprises a dedicated SRAM.

5. The host bus adapter (HBA) for the host device of claim 1, wherein the NCQ tag selection circuit comprises one or more state machines.

6. The host bus adapter (HBA) for the host device of claim 1, wherein the memory and the NCQ tag selection circuit are included within a Host Bus Adapter (HBA).

7. The host bus adapter (HBA) for the host device of claim 1, wherein the memory and the NCQ tag selection circuit are included in a card that is inserted within a slot of the host device.

8. The host bus adapter (HBA) for the host device of claim 1, wherein the host device comprises a computer system.

9. The host bus adapter (HBA) for the host device of claim 1, with the proviso that the host device is not a switch.

10. A host bus adapter (HBA) comprising:
a controller, the controller including:
a serial advanced technology attachment (SATA) Native Command Queuing (NCQ) tag management unit of the controller of the HBA;
a memory of the controller of the HBA to store information for each of a plurality of different NCQ tag values, wherein the information for each NCQ tag value indicates whether or not a command corresponding to each respective NCQ tag value has been issued; and
NCQ tag selection logic of the SATA NCQ tag management unit of the controller of the HBA in communication with the memory, the NCQ tag selection logic to examine the information in the memory and select an NCQ tag value having information that indicates that a command having the selected NCQ tag value has not been issued, and to perform host-side assignment of the selected NCQ tag value to a given command prior to issuance of the given command.

11. The HBA of claim 10, further comprising a second circuit in communication with the memory, the second circuit to modify information in the memory for the selected NCQ tag value after the given command having the selected NCQ tag value has been issued.

12. The HBA of claim 10, wherein the memory has thirty-two storage locations to store information for thirty-two different NCQ tag values.

13. The HBA of claim 10, wherein the memory comprises SRAM.

14. The HBA of claim 10, wherein the NCQ tag selection logic comprises one or more state machines.

15. The HBA of claim 10, wherein the controller is included in a card that is inserted in a slot of a host device.

16. The HBA of claim 10, wherein the controller is connected to a motherboard of a host device.

* * * * *